Figure 20:
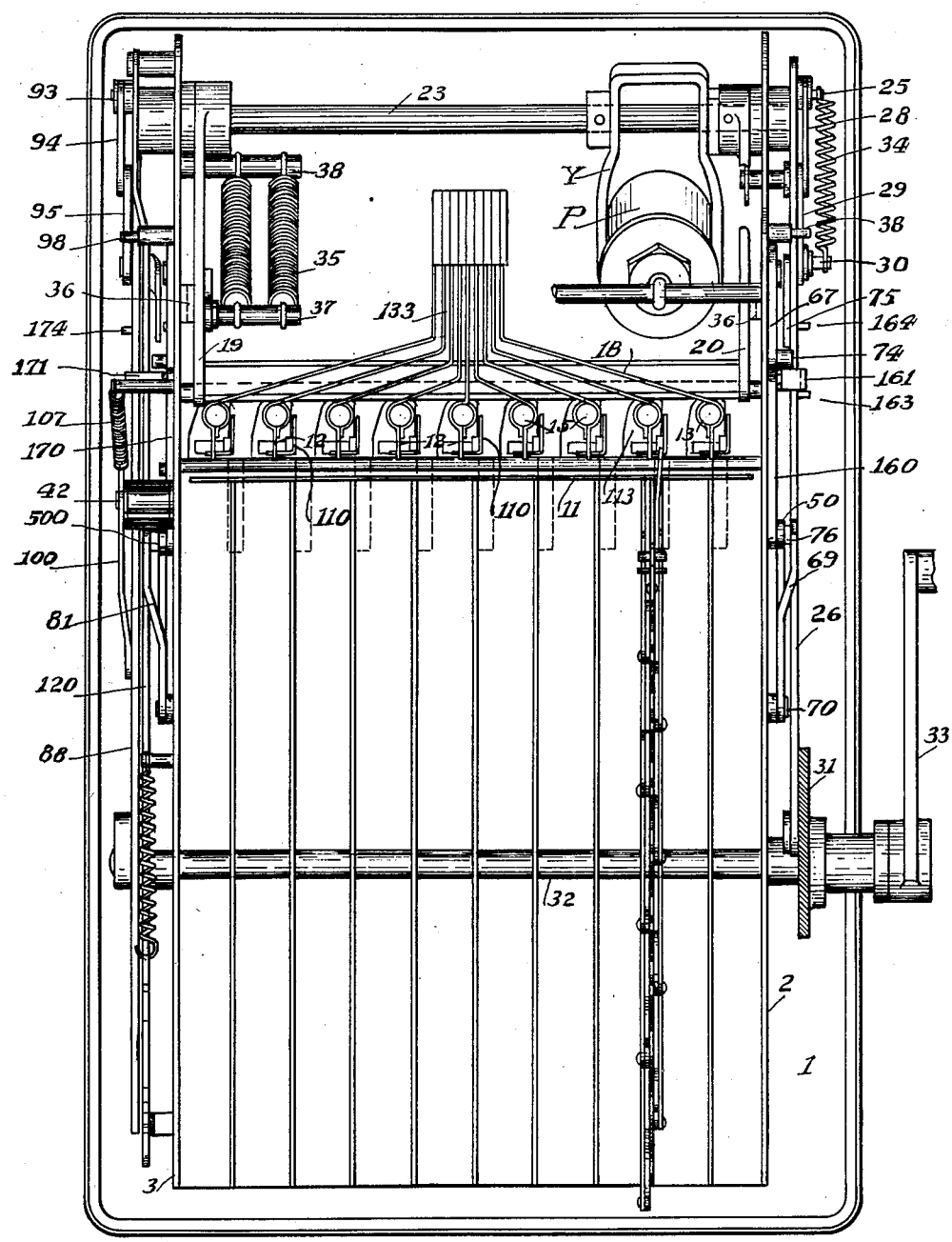

J. C. LOTTERHAND.
CARRYING MEANS FOR ADDING MACHINES.
APPLICATION FILED MAR. 5, 1914.
1,104,686.
Patented July 21, 1914.
7 SHEETS—SHEET 1.
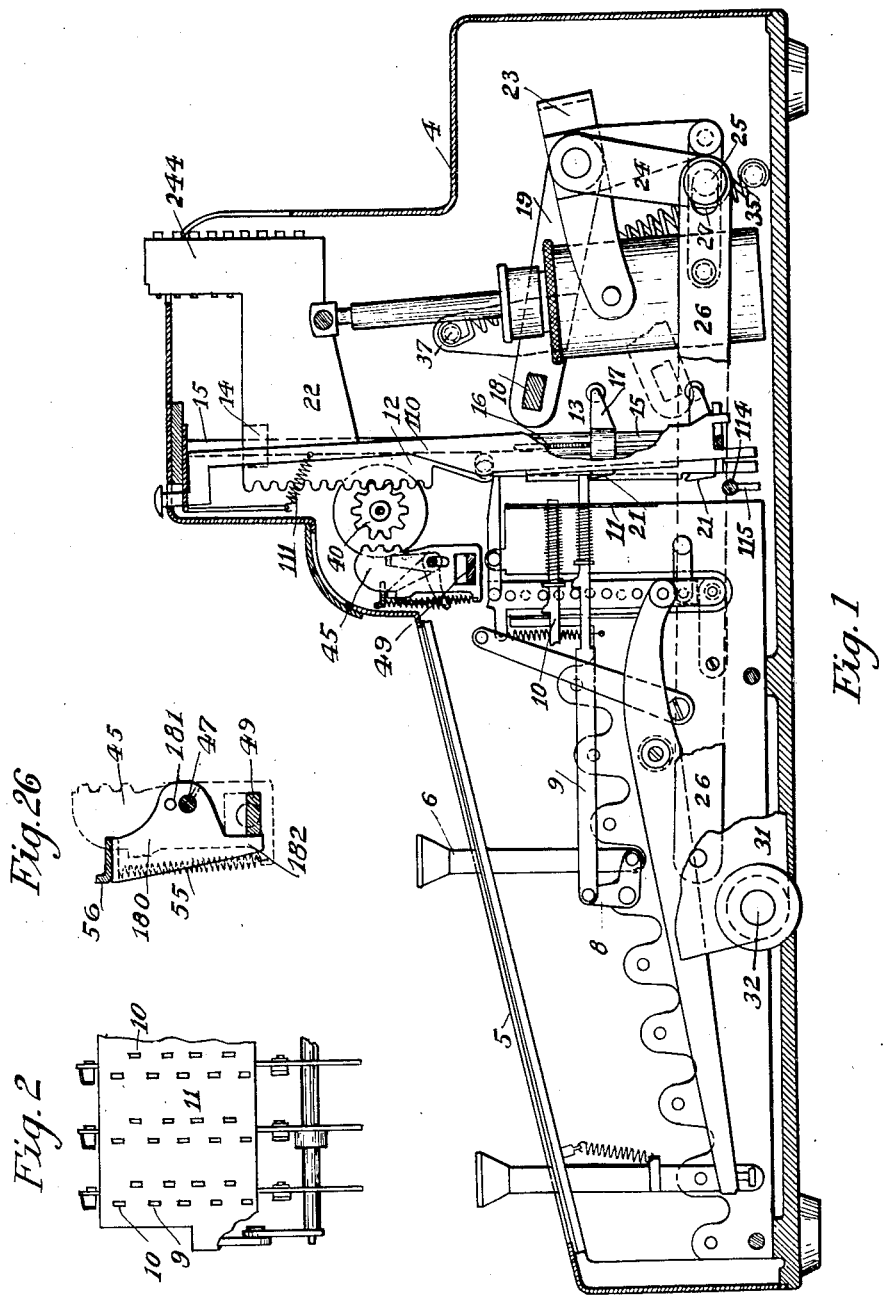
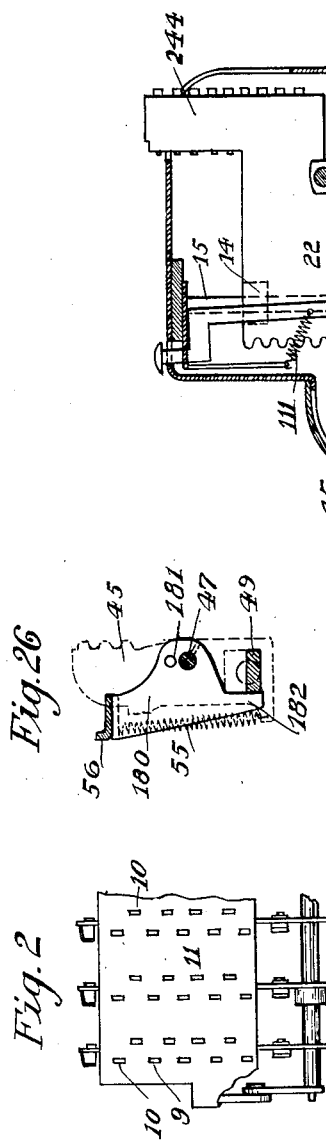
Witnesses:
Inventor

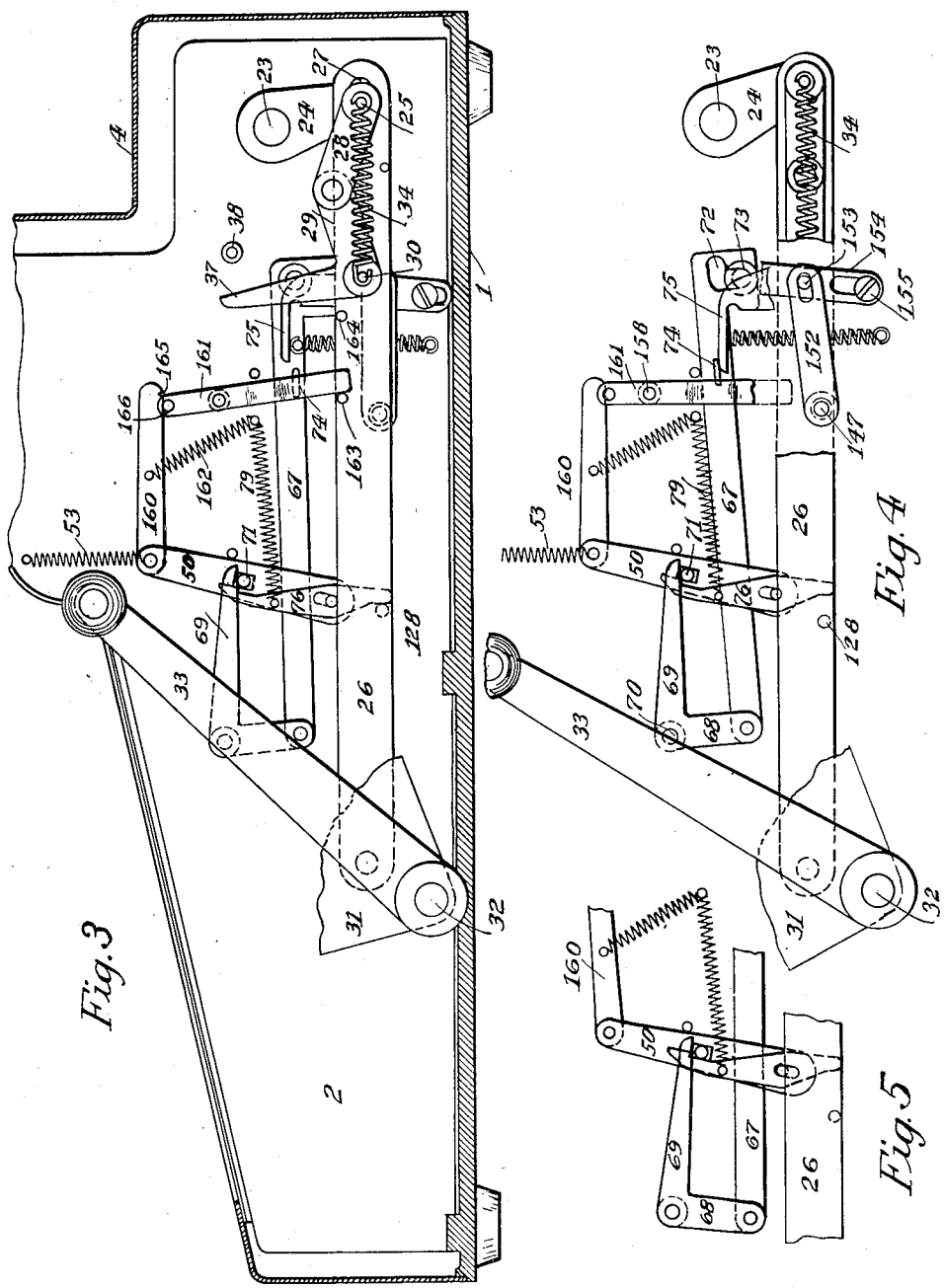

J. C. LOTTERHAND.
CARRYING MEANS FOR ADDING MACHINES.
APPLICATION FILED MAR. 5, 1914.
1,104,686.
Patented July 21, 1914.
7 SHEETS—SHEET 3.
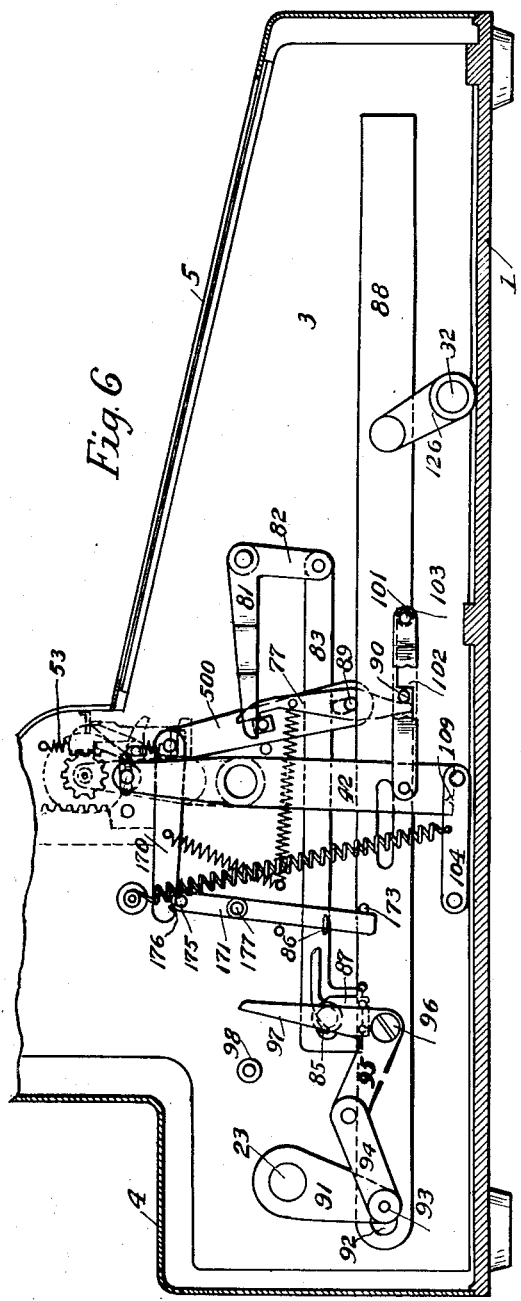
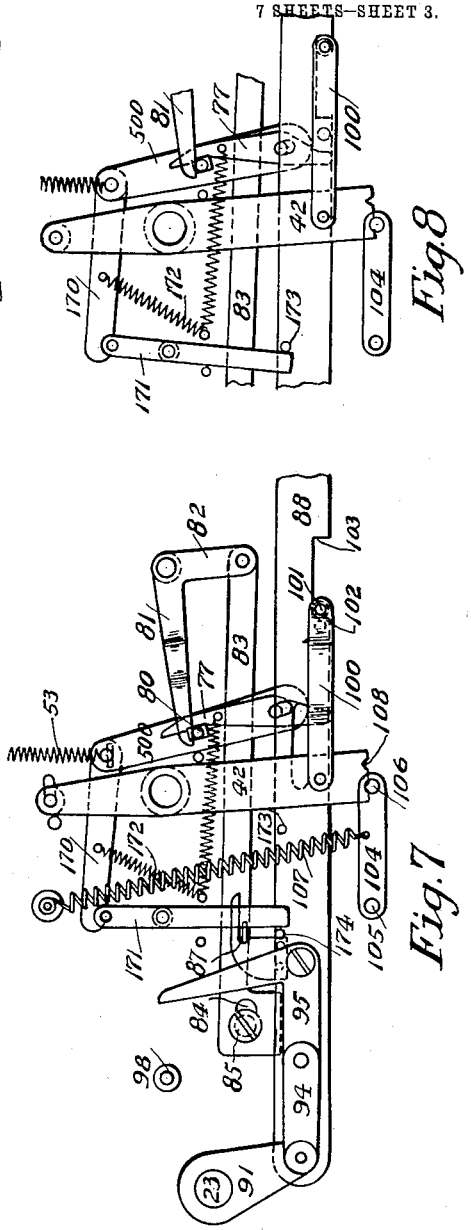
Witnesses:
Inventor
Jason C. Lotterhand.
By his Attorney
William H. Reid.

J. C. LOTTERHAND.
CARRYING MEANS FOR ADDING MACHINES.
APPLICATION FILED MAR. 5, 1914.
1,104,686.
Patented July 21, 1914.
7 SHEETS—SHEET 4.
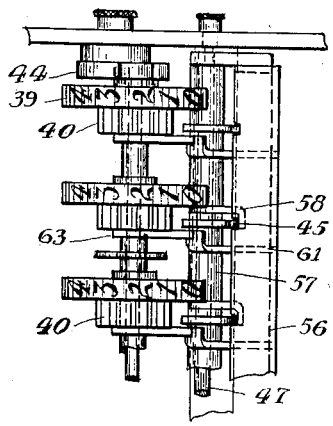
Fig 9
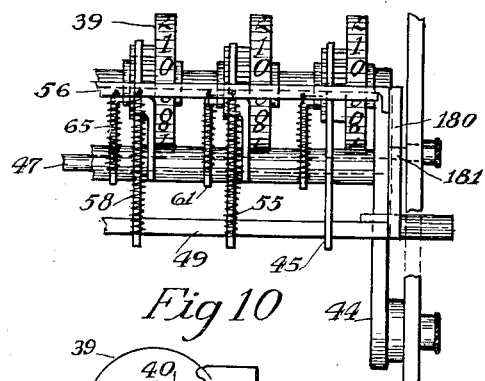
Fig 10
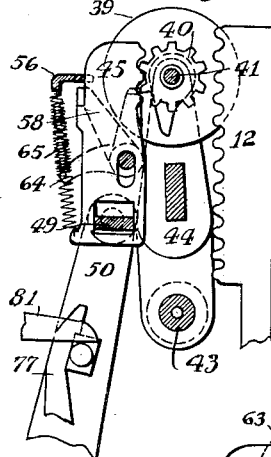
Fig.13
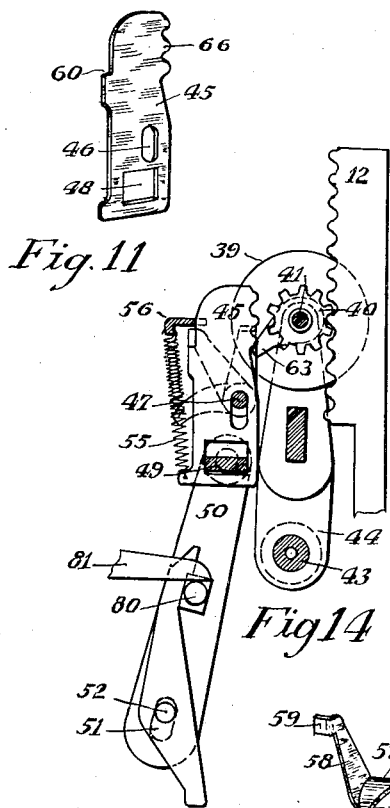
Fig.11
Fig.14
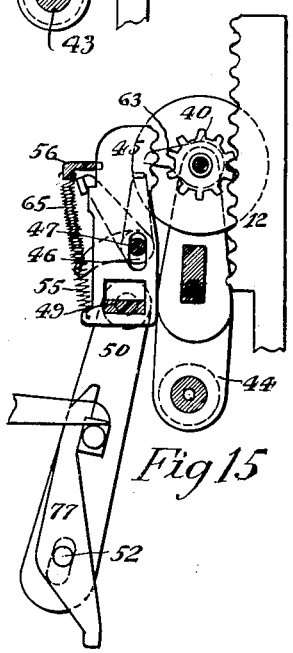
Fig 15
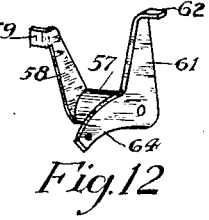
Fig.12
Witnesses:
Inventor
Jason C. Lotterhand
By his Attorney
William H. Reid J. C. LOTTERHAND.
CARRYING MEANS FOR ADDING MACHINES.
APPLICATION FILED MAR. 5, 1914.
1,104,686.
Patented July 21, 1914.
7 SHEETS—SHEET 5.
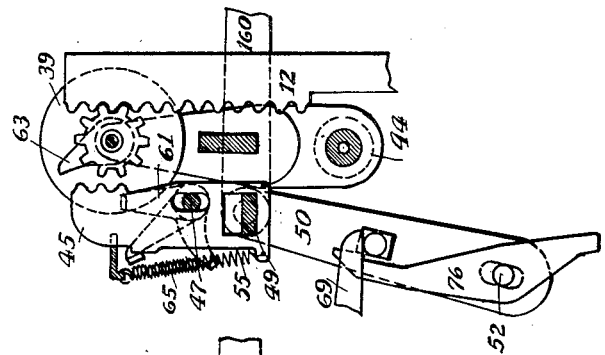
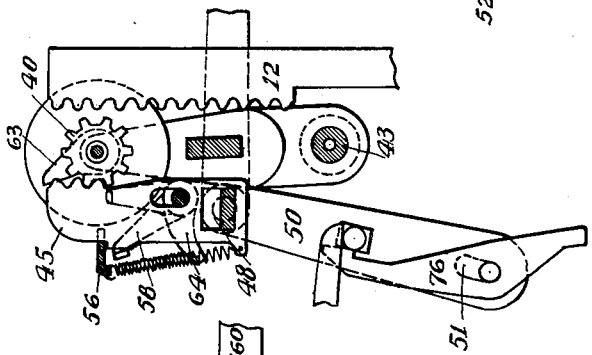
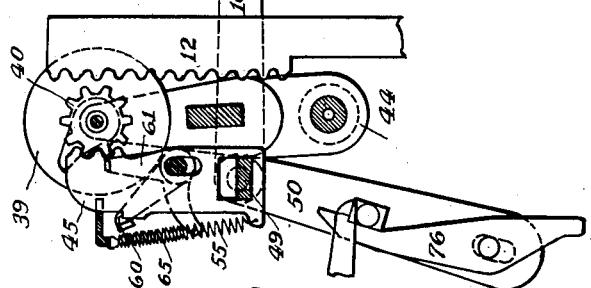
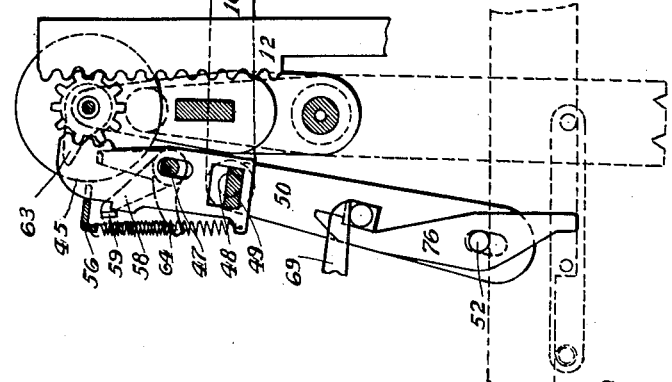

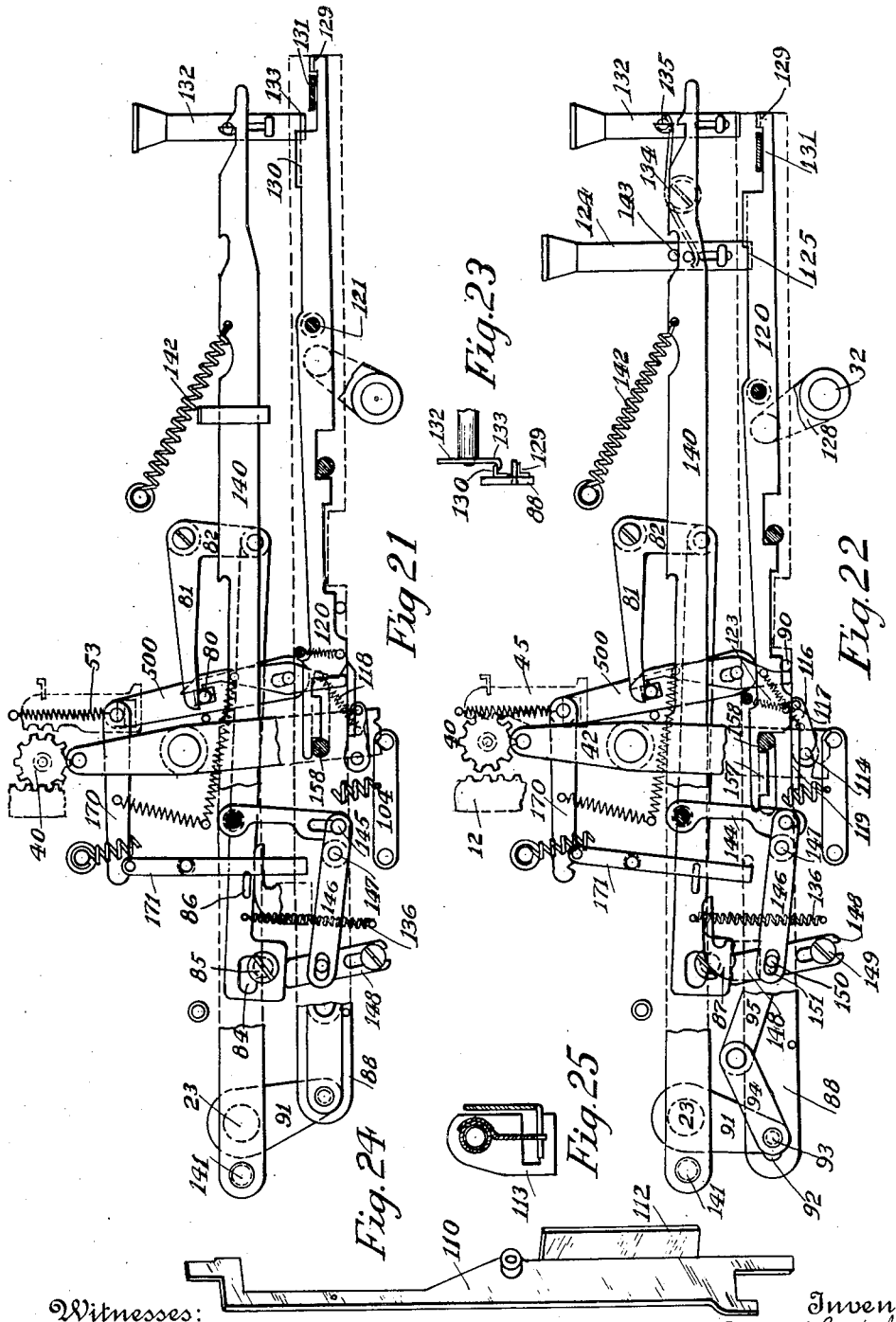

UNITED STATES PATENT OFFICE.

JASON C. LOTTERHAND, OF NEW YORK, N. Y., ASSIGNOR TO ADDOMETER CORPORATION, OF NEW YORK, N. Y., A CORPORATION OF DELAWARE.

CARRYING MEANS FOR ADDING-MACHINES. REISSUED

1,104,686.      Specification of Letters Patent.      Patented July 21, 1914.

Application filed March 5, 1914. Serial No. 822,584.

*To all whom it may concern:*

Be it known that I, JASON C. LOTTERHAND, citizen of the United States, and resident of New York city, in the county of New York and State of New York, have invented certain new and useful Improvements in Carrying Means for Adding-Machines, of which the following is a specification.

This invention relates to an improved form of carrying or transfer mechanism in an adding machine, in whose arrangement a set of rack bars reciprocate in fixed paths, while the coöperating numeral pinions are bodily moved into and out of engagement with these rack bars to be rotated thereby; and which carrying mechanism includes a set of members that engage the numeral pinions when the latter are free from the rack bars, and serve to advance them a unit distance to carry at the proper stage.

The main object of the invention is to provide an arrangement of such numeral wheel advancing member for carrying, that will be caused to perform this carrying operation at the proper time, and which member will be also caused to engage the numeral pinion when the latter is still in engagement with its respective rack bar, and which member will remain in engagement with the numeral pinion when it is returned to its normal position free from the rack bar, to thereby prevent the numeral pinion from shifting, as it might do if it were not engaged by this member when it is shifted from the rack bar back to its normal position free from the rack bar.

In the accompanying drawings illustrating one embodiment of my invention, Figure 1 is a side elevation with one side plate omitted. Fig. 2 is a detail showing the stop bars. Fig. 3 is a partial side elevation. Fig. 4 is a partial view showing some of the parts shown in Fig. 3 in different relative positions. Fig. 5 is a view of these parts in another position. Fig. 6 is a side elevation at the opposite side from that shown in Fig. 1. Figs. 7 and 8 are views of the parts shown in Fig. 6 in different positions. Fig. 9 is a plan view of some of the numeral wheels and pinions and operating parts. Fig. 10 is a front elevation of the parts shown in Fig. 9. Fig. 11 shows one of the slides that engages the numeral pinions to carry. Fig. 12 shows one of the detents for the carrying mechanism. Fig. 13 is a side elevation of the numeral pinions and adjacent operating parts. Figs. 14 to 19 inclusive show the same parts in different stages during one cycle of operation; Fig. 20 is a plan view of some of the parts with the key board and the adding mechanism removed. Figs. 21 and 22 show certain parts of the right side of the machine. Fig. 23 is a detail showing the total key. Fig. 24 shows the lock plate for the rack bars. Fig. 25 is a section of the same; and Fig. 26 shows the mounting of the rod for the slides.

In the machine as illustrated the adding mechanism is controlled by keys upon the operation of the handle, and printing mechanism is shown in a general way but forms no part of the present invention. In machines of this character it is usual to have the type carried by or directly connected with the rack bars that control the numeral pinions.

The machine also includes totalizing mechanism as well as means to restore the numeral wheels to zero position; but only so much of such mechanism will be described as is necessary to understand the novel features of the invention; most of the totalizing mechanism set forth herein being subject matter of another application of mine, Serial No. 745,892.

In the drawing the machine is shown as comprising a suitable base 1, and upright side plates 2 and 3, which three members serve to carry the operating parts of the device. A suitable casing 4 is provided that may be formed of an integral top with two side and two end members. At the front of the machine is shown a suitable plate 5, somewhat inclined, at which portion are arranged the usual banks of keys, 6, see Figs. 1 and 2. These keys carry stems 7 supported for vertical movement and pivoted to a bell-crank 8. A horizontally moving stop-bar 9 is shown, connected to the bell-crank, that will be advanced when the key 6 is depressed. A second stop-bar 10 is shown in a retracted position, the stop-bar 9 being shown as advanced and projecting some distance beyond a vertical plate 11. These stop-bars and operating keys form no part of the present invention, and it will be sufficient to understand that the stop-bars are caused to project beyond the plate 11 when the appropriate keys are depressed, and by suitable means the stop-bars are retracted.

There is a number of banks of these keys, each bank having the usual nine keys, from 1 to 9, and for each bank there is one numeral wheel, or pinion. For each of said banks of keys and corresponding set of stop-bars 9, is a rack-bar 12, and from Fig. 20, it will be seen that there is a set of nine of these rack bars arranged across the machine, corresponding with the nine banks of numeral keys 6.

The rack-bars 12 are shown as vertically slidable, having bent ears 13 and 14 at their opposite ends that embrace guide-posts 15 suitably supported in the machine. These posts are shown as tubular and contain a spring 16 by which the rack bars are advanced upwardly when free to move. Each rack-bar has a tail 17 projecting rearwardly, all of which coöperate with a universal bar 18 supported at its ends on levers 19 and 20, respectively. The swinging of these levers moving the universal bar 18 downward will depress all of the rack bars to tension their springs, and will hold them in their lowermost and normal position. At the front of each rack bar is a lug 21 that, when the rack bars are permitted to rise by the universal bar, will engage one of the stop-bars 9 advanced by a key, and prevent further elevation of the particular rack bar. It will be understood that the nine stop bars in each bank are relatively positioned so that the rack bar will be permitted to rise a corresponding distance, and which is so arranged as to cause any one of its nine teeth to be positioned opposite a pre-determined point according to the stop-bar advanced. It will be observed that each rack bar, 12, has an extension 22 carrying a set of nine type 244, which coöperate with suitable printing mechanism, not shown. The levers 19 and 20 are fast to a shaft 23 suitably mounted in bearings in the side frames projecting beyond the same on each side, which shaft is shown in Fig. 1 as having fast thereon a crank-arm 24 carrying a crank-pin 25.

As indicated in Figs. 1 and 3, a bar 26 has a slot 27 at one end through which projects the said crank-pin 25, to have a limited horizontal movement therein. A link 28 has one end pivoted on the pin 25 and its other end is pivoted to one arm 29 of a bent lever that is itself pivoted at 30 on the bar 26. This forms a toggle connection between the bar 26 and the crank-arm 28, which toggle is broken as shown in Fig. 3, that is the normal position of the parts. The other end of the bar 26 is pivoted to a crank 31, fast on a main shaft 32, suitably mounted in bearings on the machine; which shaft carries the operating handle 33, see Fig. 20. Swinging this handle will rock the bar 26. When the handle is swung forward from its normal rear position, as shown in Fig. 3, it will draw the bar 26 forward, and since the toggle member 29 is pivoted to the bar 26, it will be drawn forward. A coil spring 34 connects the pivot 30 and the toggle lever 29 with the crank-pin 25, tending to keep the toggle linked in the position indicated in Fig. 3, out of alinement. When the bar 26 is drawn forward, the pin 30, moving away from the crank-pin 25, will tension the spring 34. The said shaft 23 is connected with the main operating springs 35 of the device, shown in Fig. 20, through the crank-arm 19, fast on the shaft 23 at the rear of the machine. The springs 35 are connected between the crank-pin 37 on this crank, and a stationary rod 38 carried by the said side member 4. It will be understood that these springs 35 tend to draw the link 28 rearwardly, and that they greatly over-balance the toggle spring 34. When the handle is swung forward and the bar 26 moves forward, the pin 30 will be moved forward, while the crank-pin 25 is retained in the position shown, by the said main springs. This will straighten out the toggle members, that is permitted by reason of the slot 27 in the bar 26, and it will be seen that the bar 26 will advance a short distance before any movement is given to the crank 24. But as soon as the toggle straightens, the crank-pin 25 will be held stationary at the rear portion of the slot in the bar 26, and thereupon the advanced bar 26 will carry the crank 24 forward. As soon as the crank 24 is moved, the arms 19 and 20 will swing upward carrying the universal bar. But it will be seen that this universal bar is not moved until the bar 26 has been advanced a sufficient distance to straighten the toggle.

After the handle has been drawn forward the full movement, during which time the swinging of the crank 24 puts the main springs 35 under tension, upon the handle being allowed to return, the bar 26 will be drawn rearwardly by the tension of these main springs. During this return movement, the toggle will remain straight, and just before the crank 24 reaches the limit of its rearward movement, that is determined by suitable stops 36, an arm 37 on the toggle link 29 strikes a stop pin 38 on the side member that will cause the toggle to be broken, and at this period, since the arm 28 cannot move any farther rearwardly, the spring 34 will cause swinging of the toggle members, that will draw the pin 30 rearwardly toward the now stationary pin 29, and hence further retract the bar 26.

In order to prevent the too rapid movement of the bar and handle, the parts operated at such period, I provide a suitable retarding device, such as a dash-pot P, connected with the shaft 23 by a yoke $y$. Coöperating with each of the rack bars 12 is a wheel in the form of a pinion, 40, and termed herein the numeral pinion. These are all mounted free to turn on a shaft 41 extending across the machine, and carried by supports in the form of a lever 42 fast on a shaft 43 on the left side of the machine, as shown in Fig. 16. On the other side of the machine is a lever 44 fast on said shaft 43, see Fig. 16. By rocking this shaft 43 the pinions 40 can be shifted from engagement with the rack bars 12, as indicated in Fig. 14, to a position free from the rack bars, indicated in Fig. 13. When the rack bars 12 are reciprocated a distance governed by the positioned stop-bar 9, the pinions in mesh therewith will be rotated a corresponding distance. The pinions are held in engagement with the rack bars during the movement in one direction only of the rack bars in the adding operation of the machine, and by swinging these levers the pinions are moved to disengage the rack bars during their movement in the other direction. In this particular machine, in the normal adding operation, the pinions are held away from the rack bars as indicated in Fig. 13, and after the keys have been depressed to position the stop-bars 9, the swinging of the handle and consequent rising of the universal bar 18 will permit the rack bars to rise by their compressed springs until the stop on the forward part of the rack bar engages the appropriate positioned stop bar. Thereupon, by means hereinafter set forth, the pinions are all shifted rearwardly to engage the rack bars and hold them engaged during the return movement of the rack bars caused by the return of the universal bar. Thereupon, the pinions will be rotated a distance corresponding with the movement of the rack bars, that is controlled by the stop bars.

Carrying mechanism is provided for each numeral wheel, except the last wheel on the left hand side, whereby as each wheel completes a revolution and begins the second revolution, the carrying operation takes place to advance the wheel or pinion of next higher denomination a single number. This mechanism is operative to be set during the rotation of the wheel in engagement with the rack bar, but the carrying operation is not done at such time. At a subsequent stage in the operation, after the pinions are all moved forward and disengage the rack bars, such set members are caused to effect the carrying operation.

The mechanism for the carrying operation is shown in Figs. 9-19 as comprising for each of the numeral pinions except one, an advancing member in the nature of a plate or slide 45 located in the plane of the pinion, and containing at the intermediate portion a slot 46, through all of which projects a rod 47, that extends across the machine with its ends secured in plates 180, pivoted at 181 to the side plates 2 and 3; each slide 45 being permitted an endwise movement substantially vertical relative to this rod, and also having a swinging movement on this rod as a fulcrum for the purpose of bringing its toothed end portion 66 into and out of engagement with its coöperating pinion 40. Each slide 45 also contains at its lower end a slot 48 through all of which projects a restoring bar 49 whose extremities are secured in two arms 50 and 500, that each contain a slot 51 in its lower end, through each of which projects a pin 52 mounted in the side plates of the machine. These arms rock on these pins to shift the restoring bar 49, thus causing the slides 45 to swing on the rod 47. These arms are also given an endwise movement, causing the restoring bar to rise and fall, thereby effecting an endwise movement of the slides 45, through the assistance of a spring 53 for each arm, see Fig. 3, that is secured between a pin 54 at the top of the arm, and the side plate. All of the slides are drawn downwardly by the restoring bar 49, and when the restoring bar moves upwardly, each slide is drawn upward by an individual spring 55 secured by one end to the lower end of the slide, with its upper end held to a cross plate 56, secured at its ends to the swinging plates 180.

With each of the carrying slides 45 coöperates a detent member, shown separately in Fig. 12, and comprising a hub 57 that rides free on the said rod 47 which projects through the slotted slides. Each hub 57 carries an arm 58 having a catch 59 at its extremity, that when the detent is swung, engages a ledge 60 on the front edge of each slide 45, thereby serving to hold the slide in its lowermost or normal position, as indicated in Fig. 14, and prevent upward movement of the slide by its spring 55. On the hub 57 is another arm 61 bent at the top to form a stop 62, that coöperates with a cam 63 carried by each of the pinions 40. Each hub 57 also carries an arm 64 to which is secured one end of a spring 65 whose other end is fast to the cross bar 56; the tension of this spring serving to press the catch 59 against the forward edge of the respective slide 45, to retain it engaging the ledge 60, but on rotation of the numeral wheels to add, the curved edge of the cam will strike the stop 62 and rock the detent to move the catch 59 forward away from the ledge 60, against the tension of the spring 65, thereby releasing the slide 45 from the catch; the slide being thereby free to be drawn upwardly by its spring 55 when so permitted by the restoring bar 49. The cam 63 will engage the stop when the numeral wheel completes one revolution, passing from 9 to 0, and at which stage the numeral wheel of next higher order should be advanced a unit distance to carry. But, on the reverse rotation of the numeral pinion, which is effected in the totalizing operation to restore all numeral wheels to zero, the cam 63 will bring its transverse edge to engage the stop 62 and will not shift the stop or detent, but the numeral pinion or wheel is thereby arrested at the zero position.

By any preferred means, such as those hereinafter set forth, the numeral pinions 40 are retained in the forward position (see Fig. 13) until the desired stop-bars have been advanced by the keys and upon operation of the handle or main shaft, the rack bars 12, or some of them have been elevated a distance corresponding with the stop bars advanced; and thereupon all the numeral pinions 40 are swung rearward to engage their respective rack bars. Thereupon the rack bars are moved downward to normal position by the universal bar, or other means, thus causing rotation of the numeral pinions and wheels a corresponding amount. During this rotation of the numeral wheels, should any of the pinions pass the zero position and require the carrying operation of the next higher pinion, the cam 63 is of such length that it will strike the stop 62 causing the detent to rock, and the catch 59 to disengage the ledge 60 of the slide 45, whose toothed portion 66 is in alinement with the pinion 40 of next higher denomination. This swinging of any of the detents will release the slide for the next higher numeral pinion leaving it free to be drawn upwardly by its spring 65, when so permitted by the restoring bar 49. But the carrying operation is not effected, for obvious reasons, until the numeral wheels have been returned from the rack-bar engaging position of Fig. 15, to the forward position, free from the rack bar, as indicated in Fig. 17. In such position, the restoring bar 49 is elevated, permitting the numeral wheels now in engagement with the toothed portion 475 of the slides, to be advanced a unit distance by the upward movement of the slide, in case such slide has been tripped by the detent moving its catch 59 away from the ledge 60; the slide moving upwardly from the position of Fig. 17 to that of Fig. 18, which is just sufficient to advance the numeral pinion a unit distance. The numeral pinions remain in engagement with the slides until in a subsequent operation, after the rack bars have been advanced, the numeral pinions move forward to engage the rack bars whereupon the restoring bar draws all of the advanced slides downwardly, and the spring tension on each catch, by reason of the inclined lower face of the ledge 60, will cause reëngagement of the catch 59 with the ledge 60, locking all of the slides in the lower position.

The restoring bar 49 is brought to three different horizontal positions by its operating means, and in its normal position as indicated in Figs. 13 and 14, there is a small space between the bar and the bottom of the slot 48 of each slide. This will permit a small upward movement of each slide when the cam strikes the stop of the detent to move the catch 59 away from the ledge 60, so that when the cam releases the stop and its spring swings the detent back causing the catch to again press against the forward edge of the slide, the catch cannot engage the ledge 60, but lies below the same, and hence the slide is free to move upward when permitted by the rise of the restoring bar, as shown in Fig. 15; wherein the catch has been tripped from the ledge 60 and the slide moved upward until held by the restoring bar 49.

At the beginning of an adding operation, after the numeral pinions have moved forward to engage the respective positioned rack-bars, the restoring bar, that has been moved upwardly to permit the slides to carry, as indicated in Fig. 18, is now moved downward to a position below that indicated in Fig. 14, for the purpose of shifting all of the slides 45 downwardly until each ledge 60 engages the respective catch 59, and thereupon the restoring bar 49 moves upward again to the position indicated in Fig. 14. The restoring bar 49 is also given a movement horizontally by reason of the swinging of the arm 50, at a certain stage in the operation, whereby to swing all of the slides from the forward position of Fig. 15 to engagement with the numeral wheel 40 when the latter is still in engagement with the rack bar 12, at the lower or final position of the rack bar, as indicated in Fig. 16; and remains in engagement with this numeral pinion during the forward movement of the latter to disengage the rack bar and return to normal forward position, as indicated in Fig. 17. This is for the purpose of preventing any error by reason of the shifting of the numeral pinions on their shaft, that might occur if the numeral pinions were free after leaving the rack bar until it reëngaged the toothed portions 66 of the respective slides. In the operation of the machine, the rack bar moves downward in mesh with the numeral wheel causing it to turn according to the distance traveled upward by the rack bar, and immediately the numeral wheels are carried forward. If the toothed slides were not brought to engage the numeral pinions and lock them in their forward movement, the numeral pinions might shift in one direction or the other from the proper position and thus introduce error into the calculation. But by causing the slide to swing on its rod or axis 47 to engage the pinion there is no possibility of any shifting of the pinions from their proper position.

In the normal position of the numeral wheels they are in engagement with the slides respectively as indicated in Fig. 13, either in the normal latched position of the slide, or else in the advanced position of the slide as shown in Fig. 18; so that as there has been no rotation of the numeral pinions just prior to the rearward movement of the pinions to engage the rack bars, the pinions are not liable to shift on their axes. But during the return movement of the pinions after being advanced by the rack bars, there is some chance of the pinions continuing the rotation started by the rack bars, that is absolutely prevented by the toothed slides moving rearward to engage the pinions and lock them during their forward movement to former and normal position.

The means for operating the restoring bar in timed relation to the operation of the universal bar 18, and also for operating the side lever 42 to shift the numeral pinions to engage alternately with the rack bars 12 and with the carrying slide 45 when in forward position, is as follows: On the right side of the machine is a bar 67 (see Fig. 3) pivoted to one arm 68 of a bent lever pivoted on the side plate at 70, whose other arm 69 is arranged to engage a pin 71 fast on the side arm 50 of the machine, to draw the arm downward against the tension of the spring 53. The bar 67 has a slot 72 in its other end riding on a fixed pin 73 in the frame; and this bar also carries a lug 74 arranged to be engaged by an arm or beak 75 fast on the bar 26, at the extreme forward position of the bar. A latch arm 76 contains a hole through which extends a pin 78 fixed on the side frame, the upper end of the arm 76 being hook-shaped to engage a portion of the pin 71 fast on the side arm 50; while the lower end of the arm 76 is engaged by a pin 78 fast on the side bar 26, at the latter portion of the return stroke of the handle and side bar, whereby the hook arm is swung against the tension of its retractile spring 79, to release the pin 71, permitting the arm 50 to be drawn upward by its spring 53, and the arm 69 at this stage being swung upwardly, will permit the restoring bar 49 to rise and allow all of the carrying plates 45 that have been tripped from the detent, to be drawn upward by their springs 65 to carry. As shown in Fig. 14, this hook arm will hold the side arm 50, so that the restoring bar 49 that extends through the slots 48 in the slides 45 is offset a short distance above the bottom of the slots, when the slides 45 are in the latched position as shown in this view. When the handle is swung to shift the side bar 26 forward, at the final portion of the forward stroke the arm 75 will strike the lug 74 on the bar 67 and the latter will swing the bent lever moving the arm 69 downward; and the latter striking the pin 71 will draw the arm 50 downwardly, that will move the restoring bar 49 downward, and retract all of the slides 45 that may have been tripped from the detents, causing the slides to reëngage the detents at the ledge 60; the spring 79 will draw the latch arm 76 against the pin 71, causing the hook to now pass above the pin, and as soon as the bar 26 starts rearward releasing the arm 67, the springs 53 draw the arm 50 upward until it engages the hook arm 76. Thereby it will be seen that the arm 50 and restoring bar assume three different positions, the normal position when held by the hook arm 76, an upper position when released from the hook, and a third position at the forward limit of the bar 26, when the arm 69 moves the arm downwardly. On the opposite side of the machine, (see Fig. 6) the side arm 500 carries a pin 80 engaged by one arm 81 of a bent lever pivoted on the side frame. The other arm 82 of this lever is pivoted to a bar 83 corresponding to the bar 67, whose rear slotted end 84 rides on a pin 85. The bar 83 carries a lug 86 engaged by a stop 87 fast on a side bar 88, pivoted to a crank 126 fast on the shaft 32. A hook arm 77 swings on a pivot 89 to engage the pin 80 on the side bar; the hook being tripped by a pin 90 on the side bar 88 at the forward end of this stroke. The hook plate 77 corresponds in function precisely with the said hook plate 76, and the arm 81 of the bent lever coöperates with the pin 80, as explained with relation to the similar members 69 and 71 on the opposite side of the machine. By this means the restoring bar will be moved up and down by the movements of the arms 81 and 69 in unison. Bar 88 is rocked by crank 126 fast on main handle shaft 32.

In the bar 88 is a slot 92 in which rides a crank pin 93 fast on the crank 91, to which pin is pivoted a link 94 whose other end is pivoted to an elbow 95. This elbow is pivoted at 96 to the side bar 88, the projecting arm 97 of the elbow being arranged to strike a fixed pin 98 and break the toggle joint formed by the links 94 and 95, whereupon spring 34, on the other side of the machine, will shift the side bar 88 rearwardly relative to the crank pin 93; this construction being identical with the link arrangement on the opposite side of the machine and acting in unison therewith.

The side lever 42 by means of which the numeral pinions 40 are shifted to engage alternately with the rack bars and with the toothed segments, extends downward on the left side of the machine, see Figs. 6, 7 and 8, and is pivoted to a bar 100; the forward end of which bar carries a pin 101 riding in a slot in the side frame to guide this bar. The side bar 88 has a slot into which this pin 101 projects, and as the bar 88 moves back and forth, the end walls 102 and 103 of this slot alternately engage the pin 101 at the extreme forward and rearward portions of the movement of this side bar; which will cause the lever 42 to shift to carry the numeral pinions 40, to the two positions as represented in Figs. 13 and 14 respectively, to engage and disengage the actuators or rack bars 12. In order to suitably hold the pinions in these two positions, I provide a lever 104 suitably pivoted in the side plate at 105, that carries a stop pin 106 of angular form, that is pressed by a spring 107 into notches 108 and 109 alternately, formed in the lower end of the side lever 42. These parts are so arranged that the lever will be held to retain the pinions in the said two positions as set forth.

Suitable mechanism is provided to prevent rising of the rack bars with the universal bar in the rows or banks where no stop bar has been advanced by a key. A lock or stop plate 110 is shown in Figs. 1, 20, 25 and 26, that is located in front of each rack bar and normally pulled upward by a spring 111; a flange 112 on each plate being engaged by any one of the nine stop bars 9 to shift the plate 110 rearwardly and the lower edge of the flange 112 is thereby moved out of alinement with a projection 113 on each of the rack bars 12, see Fig. 25. A shaft 114 (see Fig. 21) rocking in the side plates, carries a shutter 115 (see Fig. 1) that will swing all of the lock plates rearward and release all of these plates 110 when it is desired to take a total or a sub-total on the machine. This shaft carries a crank 116 on which is a pin 117 drawn upward by a spring 118 to engage a cam plate 119 fast on the lower edge of the side bar 88. On the side bar 88, a lever 120 is pivoted at 121, the rear end engaging a pin 122 through tension of spring 123, and when depressed the lever will strike the crank pin 117 to rock the shaft 114 and swing the shutter to release all of the rack bars, by swinging the plates 110.

On the left side of the machine is a total key 132 (see Fig. 21) vertically movable and carrying a pin 135 engaged by a spring 134 to impel the key upward. The key 132 has a hook portion 133 at its lower end that on depression will engage a hook 130 carried by the swinging lever 120, the key and lever having a relative lateral movement of resilient arrangement for such purpose. When the key 132 is depressed these hooks 130 and 133 will pass, and upon release of the key will engage, and the upward movement of the key 132 will cause the lever 120 to swing upward at its front, depressing the rear portion of it, and swinging the shutter to release the rack bars as described.

On the side bar 88 is a ledge 131 that projects over the lever 120 and is engaged by the top edge of the lever when the stem 132 is depressed to hook on to the lever hook 129, as indicated in Fig. 23. Upon the parts assuming this position by depression of this key 132, and the handle 33 being swung forward to move the side bar 88 forward, the latter will carry with it the swinging lever 120, that will bring the lug 129 forward beyond the hook 133 of the key stem, thus releasing lever 120, while the hook 133 will be retained lowered by the lug 131 on the side bar 88. But during this operation the bar 88 has carried the cam plate 119 forward while the crank 116 was held down by its pin 117 being engaged by the lever 120; hence the crank will be held down during the balance of the forward movement of the side bar 88, and a part of its rearward movement. As the side bar 88 continues its forward movement, a lug 130 on the lever 120 higher than the lug 129 on the same lever, passes above the hook 133, so that upon further forward movement of the side bar, hook 133 disengages lug 131 and engages only the lug 130. When hook 133 of the stem released lug 129 of the lever 120, spring 123 would elevate the rear portion of lever 120 and depress its front end, but which did not bring lug 130 below the plane of lug 131. Hence, the engagement of lug 130 with the hook 133 of the key stem will permit the key to be elevated by its spring and swing the front end of the lever 120 to depress a second time the rear portion of lever 120, as indicated in Fig. 21. This represents the limit of the forward movement of the side bar with its lever 120, and as the side bar begins its return movement to the rear, the lug 130 will very soon pass beyond the hook 133 of the key stem, and is now above the lug 131 on the side bar, hence the key is free to rise to its normal position, and the lever 120 is free to be returned by its spring.

A sub-total key is provided whose stem 124 is guided to slide vertically, and provided at the lower end with a hook 125 that when the stem is depressed will hook under the said lug 130 on the lever 120; which is permitted by relative side movement of the stem and lever. On depressing this key 124 to engage its hook, the key is held depressed after swinging the lever 120 upward a short distance. But as soon as the side bar 88 starts to move forward carrying with it the lever 120, lug 130 on the bar is carried beyond the hook 125 of the stem 124, thus releasing the stem 124 to return to normal position, and permitting lever 120 to return to normal position.

On the left side of the machine above the side bars 120 is a bar 140 (Fig. 21) that is pivoted at its rear end in a pin 141, which bar is moved upwardly by a spring 142. This bar 140 swings up and down adjacent the key stems 132 and 124, to engage the pin 135 on the stem 132, and to engage a pin 143 on the stem 124, against which it is pressed by said spring. A link 144 has one end pivoted to the bar 140, its other end being slotted into which projects a pin 145 on a lever 146 that is secured to a shaft 147 extending across the machine in the side plates. A bar 148 has its lower slotted end riding on a bolt 149 which bar carries a pin 150 projecting into a slot 151 in the rear end of the lever 146, by means of which the bar 148 is moved up and down, causing its upper end, against which presses the rear portion of the bar 83 through tension of spring 136, to raise and lower the bar 83. In the normal position of the bar 140 with neither the total nor the sub-total key depressed, the bar 148 will be in its depressed position, and the bar 83 will be in lowered position at its rear end, whereby the lug 86 will be normally engaged by the stop 87 fast on the bar 88. This is the normal position for setting up items in the machine upon depression of keys and swinging of the handle. On the opposite side of the machine (Fig. 3) a lever 152 is secured to the shaft 147 extending across the machine, and its slotted end engages a pin 153 fast on a slide 154, whose lower slotted end rides on a pin 155 fixed to the side bar. This slide is moved upwardly in unison with the slide 148 on the opposite side, and engages the bar 67 that is pulled downward by the spring 156 against this slide. By this means the bar 67 is raised and lowered simultaneously with the movement of the bar 83 similar thereto on the other side of the machine.

The lever 120 on the side bar 88, is provided with a lug 157 (Fig. 21) that when the rear end of this lever is swung downward engages with a pin 158 carried by the side lever 42, whereby the side bar will serve to swing this lever and thus shift the pinions toward and from the rack bars. In the normal position of the lever 120 on the side bar, its stop 157 is held above the pin 158, and the side lever 42 will be swung through the bar 100 and pin 101, which latter alternately engages the shoulders 102 and 103 of the side bar 88. But when the total key 132 is depressed this lug 157 on the bar 120 is now swung downward, and the front edge of this lug will engage the pin 158 on the side lever (as shown in Fig. 22) as soon as the handle is swung and the side bar 88 starts forward, and the numeral wheels are at once thrown into engagement with the racks. But during this movement the hook 133 of the total key will very soon release the hook 129 of the lever 120, allowing the latter to rise at the rear and shift its lug 157 away from the pin 158 on the side lever. The arm 42 will be retained in this position with the pinions engaging the rack bars, by the lock bar 104, as described. As the side bar moves forward carrying with it lever 120, the lug 129 on the lever having released the key-stem hook 133, the latter will now be held under the lug 131 on the side bar 88, that will still retain the key stem depressed, although at this time the lever 120 is free for a short period. On the further advance of the side bar and lever, the lug 131 will move forward beyond the hook 133 of the key-stem 132, but just previous to the disengagement of the lug 131, the hook 133 will pass below the hook 130 on the lever 120, and upon the lug 131 releasing the hook 133, the stem will be drawn upwardly by its spring 134, and swing the front end of lever 120 upward and depress its rear end the second time, which is the position of the parts as indicated in Fig. 21, and the pin 158 on the lever 42 will now lie to the rear of the lug 157 on the lever 120. Upon the side bar 88 and lever 120 now starting to move rearward, the engagement of this pin 158 with lug 157 will swing the side lever 42, causing the pinions to move forward away from the rack bars; and as soon as this movement is effected, the key stem 132 will have its hook 133 released from the lug 130 on the lever 120, whose rear end will be swung upward by its spring 123, to release its lug 157 from pin 158 on the lever 42. The side lever 42 will be retained in this position by its lock bar 104.

Upon depression of the sub-total key 124, its hook 125 will engage the lug 130 on the lever 120 to depress the lug portion 157 of the lever to position for engagement with the pin 158 on the side lever 42, at the initial part of the forward movement of the side bar and lever 120; which will swing the pinions into engagement with the rack bars. But the continued forward movement of the side bar will bring the lug 130 beyond the hook 125 of the sub-total key to release both the key and the lever 120, thereby freeing the pin 158 from the lug 157. The side lever 42 will remain locked in this position with the pinions still engaging the rack bars, until the final portion of the return rearward stroke of the side bar 88, when the shoulder 103 will engage the pin 101 to swing the lever 42 and shift the numeral pinions away from the rack bars.

On the right side of the machine I provide means for swinging the arms 50 and 500 back and forth to shift the restoring bar 49 and swing the slides 45 toward and from the pinions 40 when the latter are in engagement with the rack bars, as indicated in Fig. 16. An arm 160 (Fig. 3) is pivoted to the upper end of arm 50, and is notched at 165 at its rear end to engage a pin 166 on the upper end of a lever 161 that is pivoted on the side plate at 158, the lever 160 being drawn downward by a spring 162 to hold it engaging the pin 166. A pin 163 on the side bar 26, at the latter portion of the return or rearward movement of the side bar will strike the lower end of lever 161, that will shift the arm 160 forward and also the restoring bar 49; and this will rock the slides 45 on the rod 47 moving their upper toothed ends rearward into engagement with the pinions 40. By the proper location of this pin 163 on the side bar, this engagement is so timed that the slides will engage the pinions immediately after the universal bar has been returned to its lowermost position and the rack bars 12 have completed the turning of the pinions for the adding operation. And this timing is also arranged to be immediately preceding the engagement of the pin 101 with the shoulder 103 of the side bar 88, which latter swings the lever 42 to shift the pinions away from the rack bars to normal forward position. The latter operation, the forward movement of the pinions, will swing the slides on their rod 47 by the engagement therewith of the pinions, and this will shift the restoring bar and the side bars 50 and 500 rearward. It should be stated that during the rearward movement of the bar 26, the pin 163 will swing the lever 161 to effect the engagement of the slides with the pinions, and the further travel of the side bar and swinging of lever 161 will cause its pin 166 to pass forward beyond the notch 165 in the arm 160, as indicated in Fig. 3. And when the restoring bar is shifted rearward by this forward advance of the pinions 40 at the termination of the rear movement of the side bar 26, the lever 160 will simply have a further movement sliding on the pin 166, so that the lever 161 makes no interference. Another pin 164 is arranged on the side bar 26 to engage the lever 161 at the final portion of the forward movement of the bar 26, for the purpose of swinging the lever 161, causing the pin 166 to reëngage the notch 165 in the lever 160. On the opposite side of the machine a similar arrangement is provided, (Fig. 6) comprising an arm 170 pivoted to the side arm 500, which arm has a notch 176 arranged to engage a pin 175 on the upper portion of a lever 171 that swings on a fixed pivot 177, a spring 172 pressing the arm 170 against the pin 175. At the latter portion of the return rearward movement of the side bar 88, a pin 173 on the side bar will strike the lever 171 and swing it to shift the arm 170 forward, that is simultaneous with the engagement of the pin 164 with the lever 161 that swings the arm 160 forward. It will be understood that the movements of the arm 170 and lever 171 are thus identical with that of the lever 161 and arm 160 on the other side; a pin 174 on the side bar 88 serving to return the lever 171 to its former position with the pin 175 engaging the notch 176 in the lever 170.

The operation of the machine in connection with the adding and carrying mechanism, and with the total and sub-total keys is as follows: Upon depression of the item keys 6 the stop bars 9 will be advanced, and then the operating handle 33 is drawn forward. This will advance the two side bars 26 and 88, and first the two toggle members will straighten themselves into alinement, and then the crank shaft 23 will be swung to elevate the universal bar, permitting such rack bars 12 to rise as have been released by the advanced stop bars 9. At the latter portion of the forward movement of the side bar 88, its shoulder 102 will strike the pin 101 on the bar 100 to swing the side lever 42, and shift the numeral pinions into engagement with the rack bars, but which is done after the rack bars have been elevated their full distance. The lock plate 104 will hold the side lever 42 in this position with the pinions engaging the rack bars, until on the return movement of the side bar 88 the shoulder 103 will engage the pin 101 to swing the side lever 42 and move the pinions forward away from the rack bar. But at the initial portion of the return rearward movement of the side bar 88 the universal bar will be lowered to return all of the elevated rack bars to normal lowermost position, and since they are in engagement with the numeral pinions, the latter will be rotated during this return movement of the rack bars, and the desired number will be either set up in the machine, or added to the previous number or total already in the machine. This operation is repeated as often as items are set up in the machine, by first depressing the proper keys and then swinging the handle.

During the return movement of the side bars 26 and 88, the pins 163 and 173 on these bars respectively will engage the levers 161 and 171 to shift the restoring bar 49, and swing the slides 45 over to engage the numeral pinions while the latter still engage the rack bars, now in their normal lowermost position; and upon further movement of the side bars the return of the numeral pinions by the side lever 42 will swing the pinions forward away from the rack bars, that will carry the slides 45 also forward, as set forth.

It will be understood that upon any of the pinions 40 passing the zero position, the cam 63 will swing the detent arm 61 and the catch 59 of this detent will release from the ledge 60 of the slide of next higher denomination, permitting such slide to be moved upward by its spring 65 a short distance, because the restoring bar 49 is normally a short distance above the bottom of the slot of the slide. It will be understood also that the continued advance of the cam 63 releasing the detent, the catch 59 will not reëngage because of this slight advance of the slide, but the slide is not yet permitted to move upwardly to effect the carrying operation. And it will be further understood that the swinging of the slide 45 over to engage the numeral pinion and back to its former position still in engagement with the pinion, is prior to the carrying operation.

The two arms 50 and 500 are drawn upward by the springs 53 together with the restoring bar 49, but in the normal adding operation, as the side bars 26 and 88 commence their forward movement, the stops 87 and 75 engage the lugs 74 and 86 to shift the side bars and swing the levers 81 and 69, that by engagement with the pins 71 and 80 on the arms 50 and 500, move these arms downwardly, together with the restoring bar 49, until the pins 80 and 71 are engaged by the spring controlled latches 77 and 76.

It will be understood that at the conclusion of a carrying operation, some or possibly all of the slides 45, that have been released by the detent to carry, will be in the uppermost position, as indicated in Fig. 18. Therefore, at the beginning of a forward movement of the side bars, the drawing downward of the restoring bar will return all of these slides to position for reëngagement with their respective detents. As the side bars 88 and 26 move rearward, the pins 90 and 128 will strike the latches 77 and 76 to shift them away from the pins 71 and 80, and at this time the side bar lugs 86 and 74 are free from the stops on the bars 83 and 67, the arms 50 and 500 will be drawn upward by the springs 53, thereby permitting all of the slides 45 that have been tripped from the detent, to be drawn upwardly by their respective springs 65, to effect the carrying operation.

In the operation of taking a total, the key stem 132 is depressed, that will swing the lever 120 causing its lug 157 to be brought adjacent the pin 158 on the lever 42, so that as soon as the handle is swung and the side bar 88 and the lever 120 moved forward, the lever 42 will be swung to bring the pinions 40 into engagement with the rack bars 12. As explained, the lever 120 will be at once shifted to release the pin 158, but at this stage the cam 119 will strike the pin 117 to swing the shaft 114 and the shutter 115 will move rearward to release all of the racks 12 by reason of shifting of the release plates 110. The rack bars being in engagement with the pinions during their upward stroke, will rotate them all in a backward direction until the straight side of the cam 63 strikes the ear 62 on the detent, at which position the pinions will all be at zero. As the side bar 88 starts its return movement, the lever 120 is again swung to cause the lug 157 to engage the pin 158, as indicated in Fig. 21, and this will cause the lever 42 to move the pinions forward away from the rack bars, that are free to return to normal position as the universal bar is lowered. During this latter operation the swinging of link 144 and lever 146 will elevate the bars 83 and 67 so that their lugs are not engaged by the stops on the two side bars, and the arms 81 and 69 will not be swung, and hence the arms 50 and 500 will not be shifted vertically. In this totaling operation, the levers 171 and 161 will be swung by the pins on the side bars to shift the arms 170 and 160, tending to swing the slides 45 on their rod 47, but at this time the pinions 40 will have been shifted to the forward position, and the pins 175 and 166 will simply be shifted out of the notches in the arms 170 and 160.

When the sub-total key 124 is depressed, the lever 120 is swung to cause the lug 157 to engage the pin 158 on the lever 42 and swing it to shift the pinions 40 to engage the rack bars 12 at the initial part of the forward movement of the side bars. This lug and lever immediately disengage, and the pinions will be retained in such position of engagement, not only during the rising of the rack bars to cause the pinions to return to zero (when the printing is effected), but the pinions remain in engagement when the universal bar, on the return movement of the side bars, returns the rack bars to restore the number or total that was set up in the machine. During this sub-total operation the bars 83 and 67 are not shifted by the stops on the side bars 26 and 88, as has been just described in connection with the totalizing operation. And the levers 171 and 161 are not shifted by the pins 173 and 164 until at the latter part of the return movement of the side bars 88 and 26, the lever 42 has been shifted by the engagement of the shoulder 103 with the pin 101, so that there is no interference with the rotation of the pinions by the rack bars on their return movement, through the slides 45 being shifted into engagement with the pinions.

It will be understood that during these three different operations, the normal adding operation, the sub-totaling and the totaling operation, that at the latter part of the return movement of the side bars 88 and 26, the toggle links are in the alined position and the shaft 23 is swung to return the universal bar to its lowermost position, and thereupon the pin 98 strikes the arm 97 to break the toggle joint, whereupon the spring 34 on the toggle joint causes these two side bars to move still farther rearward. It is at this time that the several operations occur that result in the carrying operation by the slides.

Having thus described my invention, what I claim is:

1. In a calculating machine, the combination of a set of numeral pinions, an actuator for each pinion movable in a fixed path, a frame member on which the pinions are pivoted and which is movable to shift the pinions into engagement with and away from the actuators, a set of toothed slides one for each pinion arranged to be engaged by the pinions respectively when retracted from the actuator, means for causing the slides to advance the pinions a unit distance to carry and controlled from the rotation of the pinions by their respective actuators, and means for shifting the toothed slides over to engage their respective pinions when the pinions engage their actuators and to retain the slides and pinions in engagement during the retraction of the pinions from the actuators.

2. In a calculating machine, the combination of a set of numeral pinions, an actuator for each pinion movable in a fixed path, a frame member on which the pinions are pivoted and which is movable to shift the pinions into engagement with and away from the actuators, a set of toothed slides one for each pinion arranged to be engaged by the pinions respectively when retracted from the actuator, means for causing the slides to advance the pinions a unit distance to carry and controlled from the rotation of the pinions by their respective actuators, and a restoring bar engaging all of the slides and arranged to regulate the movement of the slides to carry, and also arranged to shift the slides to engage the pinions when the pinions are in engagement with their actuators and to retain the slides and pinions in engagement during the retraction of the pinions from the actuators.

3. In a calculating machine, the combination of a set of numeral pinions, an actuator for each pinion movable in a fixed path, a frame member on which the pinions are pivoted and which is movable to shift the pinions into engagement with and away from the actuators, a set of toothed slides one for each pinion arranged to be engaged by the pinions respectively when retracted from the actuator, a spring connected with each slide arranged to advance the slide when in engagement with its pinion to move it a unit distance to carry, a restoring bar connected with all of the slides arranged to retract the slides when advanced by their springs, means connecting each slide with its pinion for controlling the said carrying movement of the slide as each pinion completes a revolution, said slide being also movable to engage the pinions when the pinions engage their actuators, and operating means for the restoring bar arranged to move it to shift the slides into engagement with the pinions when the pinions engage their actuators and to retain the slides and pinions in engagement during the retraction of the pinions from the actuators.

4. In a calculating machine, the combination of a set of numeral pinions, an actuator for each pinion movable in a fixed path, a frame member on which the pinions are pivoted and which is movable to shift the pinions into engagement with and away from the actuators, a set of slotted toothed slides one for each pinion arranged to be engaged by the pinions respectively when retracted from the actuators, a rod on which the slides are supported at the slotted portions, a spring connected with each slide arranged to advance the slide on the rod when in engagement with its pinion to move the pinion a unit distance to carry, a restoring bar connected with all of the slides to retract them when moved by their springs, means connecting each slide with its pinion for controlling the said carrying movement of the slides as each pinion completes a revolution, said restoring bar being also operated to swing the slides on said rod over to engage the pinions when the latter engage their actuators and to retain the pinions and slides in engagement during the retraction of the pinions from the actuators.

5. In a calculating machine, the combination of a set of numeral pinions, an actuator for each pinion movable in a fixed path, a frame member on which the pinions are pivoted and which is movable to shift the pinions into engagement with and away from the actuators, a set of slotted toothed slides one for each pinion arranged to be engaged by the pinions respectively when retracted from the actuators, a rod on which the slides are supported at their slotted portions, a spring connected with each slide arranged to advance the slide on the rod when in engagement with its pinion to move the pinion a unit distance to carry, said slides each having a second slotted portion, a restoring bar projecting through the latter slotted portion of the slides and arranged to retract the slides when moved by their springs and to permit relative movement of the slides and bar, means connecting each slide with its pinion for controlling the said carrying movement of the slide as each pinion completes a revolution, and means for causing the restoring bar to swing the slides on said rod over to engage the pinions when the latter engage their actuators and to retain the pinions and slides in engagement during the retraction of the pinions from the actuators.

6. In a calculating machine, the combination of a set of numeral pinions, an actuator for each pinion, a set of toothed slides one for each pinion, a ledge on each slide, a frame member on which the pinions are pivoted and which is movable to shift the pinions to alternately engage the actuators and the toothed slides, means for causing said movement of the frame member, a cam on each said pinion, a set of detents one for each toothed slide, a catch on each detent normally in engagement with the ledge on its respective slide, each slide being supported for movement to engage its coöperating pinion when the latter engages its respective actuator, each slide being also movable in a path transverse to its said movement whereby it will advance its pinion a unit distance to carry, a stop on each detent arranged to be engaged by said cam on the forward turning of the pinion whereby to shift the detent from normal slide-engaging position, and means for moving the slides in said directions.

7. In a calculating machine, the combination of a set of numeral pinions, an actuator for each pinion, a set of toothed slides one for each pinion, a ledge on each slide, a frame member on which the pinions are pivoted and which is movable to shift the pinions to alternately engage the actuators and the toothed slides, means to cause said movement of the frame member, a cam on each said pinion, a set of detents one for each toothed slide, a catch on each detent normally in engagement with the ledge on its respective slide, each slide being supported for movement to engage its coöperating pinion when the latter engages its respective actuator, each slide being also movable in a path transverse to its said movement whereby it will advance its pinions a unit distance to carry, a stop on each detent arranged to be engaged by said cam on the forward turning of the pinion whereby to shift the detent from a normal slide engaging position, means to normally press the ledge against the said catch and upon release of the slide from the detent by the said cam to advance the plate to turn the pinion of next higher order to carry, and means to shift each toothed slide in timed relation with the movement of the pinions by the frame to retain the slide and pinions in engagement during the return of the pinions to a position free from the rack bars.

8. In a calculating machine, the combination of a set of numeral pinions, an actuator for each pinion, a set of toothed slides one for each pinion, a ledge on each slide, a frame member on which the pinions are pivoted and which is movable to shift the pinions to alternately engage the actuators and the toothed slides, means to cause said movement of the frame member, a cam on each said pinion, a set of detents one for each toothed slide, a catch on each detent normally in engagement with the ledge on its respective slide, each slide being supported for movement to engage its coöperating pinion when the latter engages its respective actuator, each slide being also movable in a path transverse to its said movement whereby it will advance its pinions a unit distance to carry, a stop on each detent arranged to be engaged by said cam on the forward turning of the pinion whereby to shift the detent from a normal slide-engaging position, a spring connected with each slide to normally press the ledge against the said catch and upon release of the slide from the detent by the said cam the spring will advance the plate to turn the pinion of next higher order to carry, and means to shift each toothed slide in timed relation with the movement of the pinions by the frame to retain the slide and pinions in engagement during the return of the pinions to a position free from the rack bars.

9. In a calculating machine, the combination of a set of numeral pinions, an actuator for each pinion, a set of slotted toothed slides one for each pinion, a ledge on each slide, a frame member on which the pinions are pivoted and which is movable to shift the pinions to alternately engage the actuators and the toothed slides, means to cause said movement of the frame member, a cam on each said pinion, a set of detents one for each toothed slide, a spring on each detent, a catch on each detent normally held by the spring in engagement with the ledge on its respective slide, a rod on which each slide is supported at its slotted part for movement to engage its coöperating pinion when the latter engages its respective actuator, each slide being also movable on said rod in a path transverse to its said movement whereby it will advance its pinion a unit distance to carry, a stop on each detent arranged to be engaged by said cam on the forward turning of the pinion whereby to shift the detent from a normal slide engaging position, a spring connected with each slide to normally press the ledge against the said catch and upon release of the slide from the detent by the said cam the spring will advance the plate to turn the pinion of next higher order to carry, and means to shift each toothed slide in timed relation with the movement of the pinions by the frame to retain the slide and pinions in engagement during the retraction of the pinions from the rack bars.

10. In a calculating machine, the combination of a set of numeral pinions, an actuator for each pinion, a set of slotted toothed slides one for each pinion, a ledge on each slide, a frame member on which the pinions are pivoted and which is movable to shift the pinions to alternately engage the actuators and the toothed slides, means to cause said movement of the frame member, a cam on each said pinion, a set of detents one for each toothed slide, a spring on each detent, a catch on each detent normally held by the spring in engagement with the ledge on its respective slide, a rod on which each slide is supported at its slotted part for movement to engage its coöperating pinion when the latter engages its respective actuator, each slide being also movable on said rod in a path transverse to its said movement whereby it will advance its pinion a unit distance to carry, a stop on each detent arranged to be engaged by said cam on the forward turning of the pinion whereby to shift the detent from a normal slide engaging position, a spring connected with each slide to normally press the ledge against the said catch and upon release of the slide from the detent by the said cam the spring will advance the plate to turn the pinion of next higher order to carry, said slides each having a second slotted portion, a restoring bar projecting through the latter slotted portions of the slides and arranged to retract the slides when moved by their springs and to permit relative movement of the slides and bar, and means for moving the restoring bar to swing the slides on said rod over to engage the pinions when the latter engage their actuators and to retain the pinions in such engagement when the pinions are retracted from the actuators to normal position.

11. In a calculating machine, the combination of a set of numeral pinions, an actuator for each pinion movable in a fixed path, a frame member on which the pinions are pivoted and which is movable to shift the pinions to engage and disengage the actuators, a set of slotted toothed slides one for each pinion arranged to be engaged by the pinions respectively when retracted from the acutators, a rod on which the slides are supported at their slotted portions, a pair of plates one on each side of the machine pivotally mounted in which the ends of said rod are secured, a spring connected with each slide to advance the slide on the rod when in engagement with its pinion to move the pinion a unit distance to carry, a restoring bar connected with all of the slides to retract them when moved by their springs, and means for causing the restoring bar to swing the slides on said rod over the engage the pinions when the latter engage their actuators and to retain the slides and pinions in engagement during the retraction of the pinions from the acutators, said rod-supporting plates being connected with the restoring bar to be swung thereby.

12. In a calculating machine, the combination of a set of numeral pinions, an actuator for each pinion movable in a fixed path, a frame member on which the pinions are pivoted and which is movable to shift the pinions to engage and disengage the actuators, a set of slotted toothed slides one for each pinion arranged to be engaged by the pinions respectively when retracted from the actuators, a pair of plates one pivotally mounted on each side of the machine, a rod carried by said plates on which said slides are supported at their slotted portions, a bar extending across between said plates, a spring connected between each slide and said bar and arranged to advance the slide on the rod when in engagement with its pinion to move the pinion a unit distance to carry, a restoring bar connected with all of the slides to retract them when moved by their springs, and means for causing the restoring bar to swing the slides on said rod over to engage the pinions when the latter engage their actuators and to retain the slides and pinions in engagement during the retraction of the pinions from the actuators, said rod-carrying plates being held in engagement with said restoring bar to be swung thereby.

13. In a calculating machine, the combination of a set of numeral pinions, an actuator for each pinion, a set of slotted toothed slides one for each pinion, a ledge on each slide, a frame member on which the pinions are pivoted and which is movable to shift the pinions to alternately engage the actuators and the toothed slides, a cam on each pinion, a set of detents one for each said slide, a pair of plates one pivotally mounted on each side of the machine, a rod on which said slides are supported at their slotted portions, said rod being mounted in said plates, a bar extending across between said plates, a spring connecting each detent with said bar, a catch on each detent normally held by the spring in engagement with the ledge on its respective slide, a stop on each detent arranged to be engaged by said cam on the forward turning of the pinion whereby to shift the detent from normal slide-engaging position, a spring connecting each slide with said bar to normally press the slide ledge against said catch whereby upon release of the slide from the detent by the cam the spring will advance the plate to turn the pinion of next higher order to carry, and means to shift each toothed slide in timed relation with the movement of the pinions by the frame to retain the slide and pinions in engagement during the retraction of the pinions from the rack bars, said side plates being retained in engagement with the restoring bar by said slide-engaging springs, to be rocked thereby.

14. In a calculating machine, the combination of a set of numeral pinions, an actuator for each pinion, a set of slotted toothed slides one for each pinion, a ledge on each slide, a frame member on which the pinions are pivoted and which is movable to shift the pinions to alternately engage the actuators and the toothed slides, a cam on each pinion, a set of detents one for each slide, a pair of plates one pivotally mounted on each side of the machine, a rod supported at its ends in said plates and projecting through said slides at their slotted portion, a bar extending across between said plates, a spring connecting each detent with said bar, a catch on each detent normally held by the spring in engagement with the ledge on its respective slide, a stop on each detent arranged to be engaged by said cam on the forward turning of the pinion whereby to shift the detent from normal slide-engaging position, a spring connecting each slide with said bar to normally press the slide ledge against said catch whereby upon release of the slide from the detent by the cam the spring will advance the plate to turn the pinion of next higher order to carry, said slides each having a second slotted portion, a restoring bar projecting through the latter slotted portions of the slides to retract the slides when moved by their springs and to permit relative movement of the slides and bar, and means for moving the restoring bar to swing the slides on said rod over to engage the pinions when the latter engage their actuators and to retain the pinions in such engagement when the pinions are retracted from the actuators, said side plates being retained by said slide-engaging springs in contact with the restoring bar to be swung thereby.

15. In a calculating machine, the combination with an actuator and a numeral pinion, of a carrying plate, means for moving the plate in one path to effect the carrying operation, and means for moving the plate in another path to engage and disengage the numeral pinions.

16. In a calculating machine, the combination with an actuator and a numeral pinion, of a carrying plate, means for moving the plate in one path to effect the carrying operation, means for moving the plate in another path to engage and disengage the numeral pinions, the machine including a totalizing device, and means for causing the operation of the latter device to render inoperative the said means for moving the plate for the carrying operation.

17. In a calculating machine, the combination of an actuator movable in a fixed path, a numeral pinion movable to engage and disengage the actuator, a carrying plate movable to partake of the movement of the pinion to and from the actuator, said plate being also movable in a path transverse to its said movement to effect the carrying operation.

18. In a calculating machine, the combination of an actuator movable in a fixed path, a numeral pinion movable to engage and disengage the actuator, a carrying plate movable to partake of the movement of the pinion to and from the actuator, said plate being also movable in a path transverse to its said movement to effect the carrying operation, and means for causing the plate to assume three different positions in the latter path of movement.

19. In a calculating machine, the combination of an actuator movable in a fixed path, a numeral pinion, means for moving the pinion to engage and disengage the actuator, a carrying plate arranged to be engaged by the pinion when shifted away from the actuator, means for causing the carrying plate to lock the pinion against movement when shifted away from the actuator.

20. In a calculating machine, the combination of a set of actuators, a set of numeral pinions movable to engage and disengage the actuators, a set of carrying plates one for each pinion, a restoring bar connected with each of the plates to control their movements, means to move the plates to carry, a side bar on each side of the machine that is caused to reciprocate, an arm on ecah side of the machine connected with the restoring bar, a pin on each arm, a hook arm on each side of the machine arranged to engage said pins respectively, a pin on each side bar arranged to engage the hook arm causing it to release the said arms and restoring bars, springs arranged to move the restoring bar upward when released from the hook arm, and means on each side of the machine connected with the side bars and arranged to engage the side arms to shift the restoring bar downward and cause it to reëngage the hook arm.

21. In a calculating machine, the combination of a set of actuators, a set of numeral pinions movable to engage and disengage the actuators, a set of carrying plates one for each pinion, a restoring bar connected with each of the plates to control their movements, means to move the plates to carry, a side bar on each side of the machine that is caused to reciprocate, an arm on each side of the machine connected with the restoring bar, a pin on each arm, a hook arm on each side of the machine arranged to engage said pins respectively, a pin on each side bar arranged to engage the hook arm causing it to release the said arms and restoring bars, springs arranged to move the restoring bar upward when released from the hook arm, means on each side of the machine connected with the side bars and arranged to engage the side arms to shift the restoring bar downward and cause it to reengage the hook arm in the normal operation of adding, the machine including a totalizing device arranged to disconnect said latter means and prevent movement of the restoring bar during the totalizing operation.

22. In a calculating machine, the combination of a set of actuators, a set of numeral pinions movable to engage and disengage the actuators, a set of carrying plates one for each pinion, a restoring bar connected with each of the plates to control their movements, means to move the plates to carry, a side bar on each side of the machine that is caused to reciprocate, an arm on each side of the machine connected with the restoring bar, a pin on each arm, a hook arm on each side of the machine arranged to engage said pins respectively, a pin on each side bar arranged to engage the hook arm to cause it to release the said arms and restoring bars, springs arranged to move the restoring bar upward when released from the hook arm, a bent lever on each side of the machine arranged to engage said pin on the arm that engages said hook arm, a bar connected with each said bent lever and provided with a lug, and a stop on each of the side bars arranged to engage said lug to swing the bar and bent lever and thereby shift the restoring bar downward causing it to reëngage the hook arm.

23. In a calculating machine, the combination of a set of actuators movable in a fixed path, a set of numeral pinions movable to engage and disengage the actuators, a set of carrying slides one for each pinion, a restoring bar connected with all of the slides to control their movements, a spring connected with each slide to move it in one direction to effect the carrying operation, a set of detents one for each slide arranged to coöperate therewith, a cam on each pinion arranged to shift the detent coöperating therewith, a side bar on each side of the machine that is caused to reciprocate, an arm on each side of the machine connected with the restoring bar, a pin on each arm, a hook arm on each side of the machine arranged to engage said pins respectively, a pin on each side bar arranged to engage the hook arm causing it to release the said arms and restoring bars, springs arranged to move the restoring bar upward when released from the hook arm, and means on each side of the machine connected with the side bars and arranged to engage the side arms to shift the restoring bar downward and cause it to reëngage the hook arm.

24. In a calculating machine, the combination of a set of actuators, a set of numeral pinions movable to engage and disengage the actuators, a set of carrying plates one for each pinion, a restoring bar connected with all of the plates to control their movements, means connected with each plate to move it in one direction to carry, a side bar on each side of the machine that is caused to reciprocate, an arm on each side bar of the machine connected with the restoring bar, means connected with the side bars arranged to shift the arms and restoring bar vertically to control the movement of the carrying plates, a lever pivoted on each side of the machine, a spring controlled arm carried by the restoring bar at each end and engaging said latter lever, and stops on the side bars arranged to swing said levers to cause said spring controlled arms to shift the restoring bar and swing the carrying plates to engage the pinions when the latter are in engagement with their actuators.

25. In a calculating machine, the combination of a set of actuators, a set of numeral pinions movable to engage and disengage the actuators, a set of carrying plates one for each pinion, a restoring bar connected with all of the plates to control their movements, means connected with each plate to move it in one direction to carry, a side bar on each side of the machine that is caused to reciprocate, an arm on each side of the machine connected with the restoring bar, means connected with the side bar arranged to shift the arms and restoring bar vertically to control the movements of the plates to carry, a lever pivoted on each side of the machine, a pin on the lever, a notched arm connected with the restoring bar on each side, a spring on each latter arm pressing it on said latter lever at the notched portion, and stops on the side bars arranged to engage said levers to cause them and the notched arms to shift the restoring bar and swing the carrying plates to engage the pinions when the latter engage their actuators.

26. In a calculating machine, the combination of a set of actuators, a set of numeral pinions movable to engage and disengage the actuators, a set of carrying plates one for each pinion, a restoring bar connected with all of the plates to control their movements, means connected with each plate to move it in one direction to carry, a side bar on each side of the machine that is caused to reciprocate, an arm on each side of the machine connected with the restoring bar, means connected with the side bar arranged to shift the arms and restoring bar vertically to control the movements of the plates to carry, a lever pivoted on each side of the machine, a pin on the lever, a notched arm connected with the restoring bar on each side, a spring on each latter arm pressing it on said latter lever at the notched portion, stops on the side bars arranged to engage said levers to cause them and the notched arms to shift the restoring bar and swing the carrying plates to engage the pinions when the latter engage their actuators, and other stops on the side bars arranged to engage said levers and swing them to reengage the notched arms at the notched portions.

27. In a calculating machine, the combination of a set of actuators movable in a fixed path, a set of numeral pinions movable to engage and disengage the actuators, a set of carrying plates one for each pinion, a restoring bar connected with all of the slides to control their movements, a spring connected with each slide to move it in one direction to effect the carrying operation, a set of detents one for each slide arranged to coöperate therewith, a cam on each pinion arranged to shift the detent coöperating therewith, a side bar on each side of the machine that is caused to reciprocate, an arm on each side of the machine connected with the restoring bar, means connected with the side bars arranged to shift the arms and restoring bar vertically to control the movements of the slides to carry, a lever pivoted on each side of the machine, a spring controlled arm carried by the restoring bar at each end and engaging said latter lever, and stops on the side bars arranged to swing said levers to cause said spring controlled arms to shift the restoring bar and swing the carrying slides to engage the pinions when the latter are in engagement with their actuators.

28. In a calculating machine, the combination of a set of actuators movable in a fixed path, a set of numeral pinions movable to engage and disengage the actuators, a set of carrying plates one for each pinion, a restoring bar connected with all of the plates to control their movements, means connected with each plate to move it in one direction to effect the carrying operation, a side bar on each side of the machine that is caused to reciprocate, an arm on each side of the machine connected with the restoring bar, a pin on each arm, a hook arm on each side of the machine arranged to engage said pins respectively, a pin on each side bar arranged to engage the hook arm causing it to release said arms and restoring bars, springs arranged to move the restoring bar upward when released from the hook arms, means on each side of the machine connected with the side bars and arranged to engage the side arms to shift the restoring bar downward and cause it to reengage the hook arm, a lever pivoted on each side of the machine, a spring controlled arm connected with the restoring bar at each end of the bar and engaging said latter levers respectively, and stops on the side bar arranged to swing said levers to cause the spring controlled arms to shift the restoring bar and swing the carrying plates to engage the pinions when the latter are in engagement with their actuators.

29. In a calculating machine, the combination of a set of actuators, a set of numeral pinions movable to engage and disengage the actuators, a set of carrying plates one for each pinion, a restoring bar connected with all of the plates to control their movements, means connected with each plate to move it in one direction to carry, a side bar on each side of the machine that is caused to reciprocate, an arm on each side of the machine connected with the restoring bar, a pin on each arm, a hook arm on each side of the machine arranged to engage the hook arm causing it to release said arms and restoring bars, springs arranged to move the restoring bar upward when released from the hook arms, a bent lever on each side of the machine arranged to engage the pin on each restoring bar arm, a bar on each side connected with said bent lever and provided with a lug, a stop on each side bar arranged to engage said lug and swing said bent levers to depress the side arms and restoring bar and shift the carrying plates, to cause the side arms to reengage the hook arm, a lever pivoted on each side of the machine, a spring controlled arm connected with the restoring bar at each end of the bar and engaging said latter levers respectively, stops on the side bars arranged to swing said levers to cause the spring controlled arms to shift the restoring bar and swing the carrying plates to engage the pinions when the latter are in engagement with their actuators, and other stops on the side bars arranged to engage said levers to have their pins reengage the notched portions of the said spring controlled arms.

30. In a calculator the combination with actuators movable in fixed paths, numeral pinions bodily movable to engage and disengage the actuators, of movable locking members, and means for moving the locking members to engage the pinions while in engagement with their actuators, and to retain the locking members in such engagement during the return of the pinions to normal position free from the actuators.

31. In a calculator, the combination of actuators movable in fixed paths, numeral pinions movable to engage and disengage the actuators, carrying plates movable to partake of the movements of the pinions to and from the actuators, said plates being also movable in a path transverse to said movement to effect the carrying operation, a restoring bar engaging all of the said plates, and means for moving the restoring bar in two different paths to effect said two movements of the carrying plates.

32. In a calculator, the combination of actuators movable in fixed paths, numeral pinions movable to engage and disengage the actuators, carrying plates movable to partake of the movements of the pinions to and from the actuators, said plates being also movable in a path transverse to said movements to effect the carrying operation, a pair of swinging arms, a restoring bar carried by said arms, and connected with all of the carrying plates, means for swinging said arms to move the restoring bar and shift the plates to and from the pinions, and means for bodily moving the arms to shift the restoring bar in another direction to effect the carrying movements of the plates.

JASON C. LOTTERHAND.

Witnesses:
E. M. SQUAREY,
HAROLD S. SLOAN.